Aug. 6, 1940.   A. D. NIEMEYER   2,210,773
COURSE AND BEARING INDICATOR
Filed Jan. 14, 1939   2 Sheets-Sheet 1
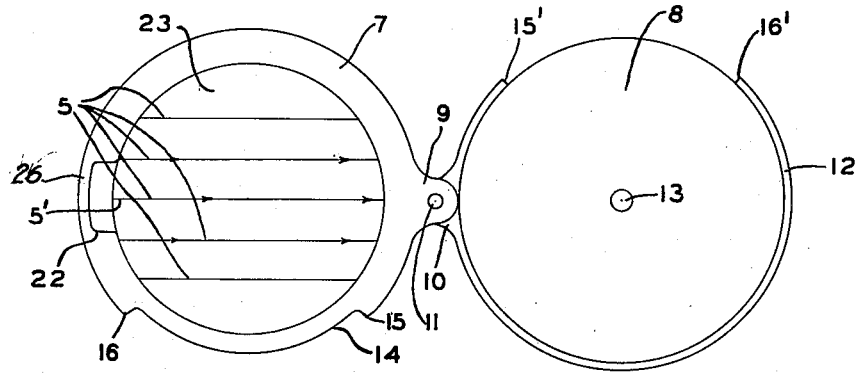
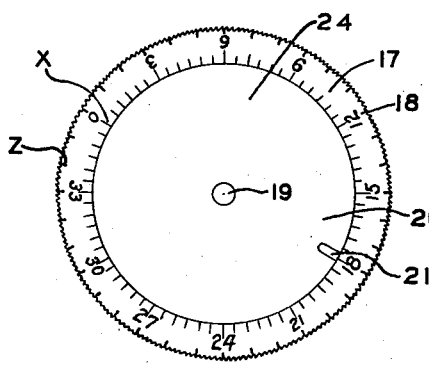
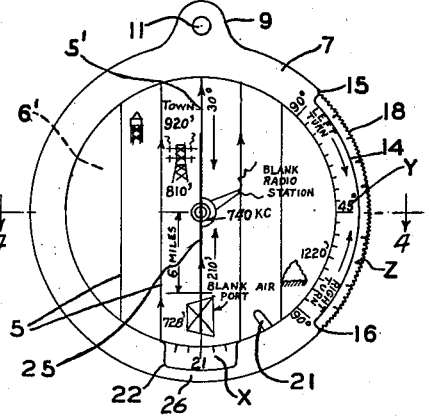
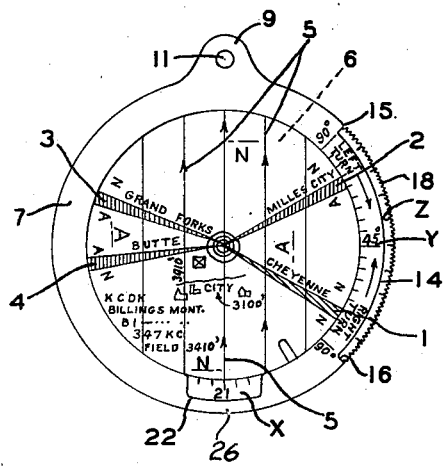
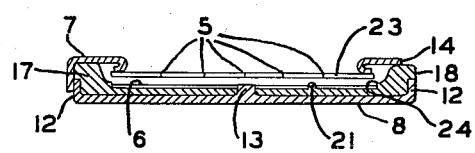
Inventor
ALVIN D. NIEMEYER
By William C. Linton
Attorney

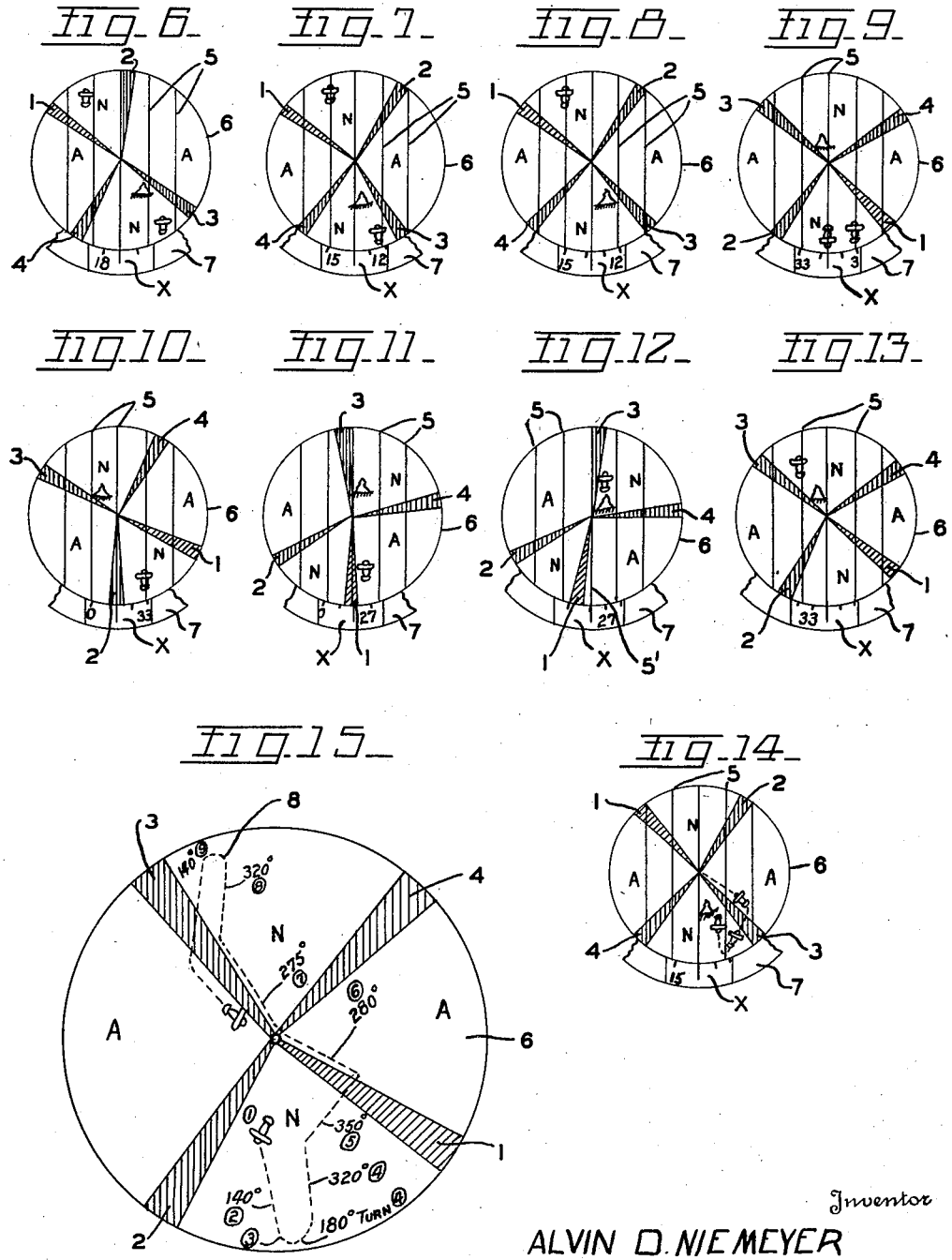

Patented Aug. 6, 1940

2,210,773

UNITED STATES PATENT OFFICE 2,210,773

COURSE AND BEARING INDICATOR

Alvin D. Niemeyer, Seattle, Wash.

Application January 14, 1939, Serial No. 251,009

7 Claims. (Cl. 33—1)

The present invention relates to indicating instruments to be used with radio and magnetic compasses as used in conjunction with radio range beacons in the navigation of aircraft.

The United States Department of Commerce has placed in service throughout the United States a system of radio range stations to be used by pilots of aircraft to assist them in the navigation of the aircraft towards desired points of the country. The operation of these radio range stations and the method to be followed by a pilot in using the same for the purpose of navigating when there is poor visibility or to serve as a verification of other methods of air navigation when the weather is good, is described in the U. S. Department of Commerce Aeronautic Bulletin No. 27 of July 1st, 1937, and this is further supplemented on pages 203 to 210 inclusive, of Air Commerce Bulletin of March 15th, 1938.

Navigators using the foregoing methods of navigation have heretofore been supplied with maps giving certain radio information such as courses, frequency, time of broadcast, altitude of the field nearest the radio range station and description of or procedure for using such facilities. This information has been arranged in large binders and for the large commercial airlines results in a very large book. This information has been further compiled upon endless sheets mounted upon rollers to be unrolled as used. However, the information as supplied by these methods is very difficult to locate, requires considerable space, and will easily confuse the pilot.

In order to reduce the difficulties presented to a navigator by the foregoing methods of supplying the information, small maps showing the courses transmitted by a particular radio range beacon with additional information placed thereon showing the location of obstructions to the flight and their altitude above sea level, as well as further information relative to the broadcasting, which maps are made from information obtained every fifteen days by the Hydrographic Office of the United States Navy in their pamphlet "Notice to Aviators," are to be used as a part of the present course and bearing indicator.

The principal object of the present invention is to provide an indicating instrument adaptable for assisting airmen to navigate their aircraft.

A further object of the present invention is to provide a course and bearing indicator which is relatively small as compared with the indicating instruments for like purposes used heretofore and which indicator can be used to quickly find magnetic radio bearings when used with a radio compass and magnetic compass.

Another object of the present invention is to provide a course and bearing indicator which may be used by a navigator to plot an intended course in advance and, further, can compute acurate predetermined courses.

A further important object of the present invention is to provide a course and bearing indicator to assist a navigator in finding the necessary direction and course for intercepting a given radio leg without first turning the plane in said direction.

Another object of the present invention is to provide a means for determining the degree of drift of an aircraft necessary to remain on a given course.

Other objects of the present invention will be in part obvious and in part pointed out in the following detailed description of the accompanying drawings.

In the drawings:

Fig. 1 is a top view of the casing forming a part of the present invention in an open position.

Fig. 2 is a top view of a disc forming a map holder and compass rose.

Fig. 3 is a top view of the device comprising the present invention.

Fig. 4 is a cross sectional view taken on line 4—4 of Fig. 5.

Fig. 5 is a top view of a device similar to that shown in Fig. 3 but having a modified form of map mounted therein.

Figs. 6 to 14 inclusive, show, for the purpose of an illustration, a portion of the present device and the relative positions of the members to one another in working a navigation problem.

Fig. 15 is a diagrammatic view of courses marked by a radio range beacon and the path relative thereto followed by the aircraft in the aforementioned illustration.

Referring now more particularly to the accompanying drawings in which like reference characters designate like parts, numeral 8 designates the base of a casing for containing the members forming the present invention. Base 8 has formed with and extending at right angles from a portion of its periphery, a wall, which wall 12 is open at points 15' and 16'. The arc formed upon base 8 between points 15' and 16' is equal to 90°. Wall 12 has further formed therewith a projection 10, which projection 10 is pivotally connected to a projection 9 formed with and extending from a top 7. A tubular pin connects projection 9 to projection 10 for forming the pivotal relationship.

Said top 7 has a large opening centrally located thereof across which is positioned a transparent disc 23 formed preferably of glass. The diameter of top 7 is reduced between points 15 and 16 and which reduced part is designated by the numeral 14. The arc formed by reduced portion 14 is equal to 90° and is so positioned as to coincide with arc 15'—16' upon the pivoting of cover 7 over and on top of base 8. Top 7 further has a reduced portion 26 which has a portion of disc 23 set within the recess formed thereby for forming a sight opening 22.

As best shown in Fig. 2, a disc 24 which forms the map carrying member and has markings thereon corresponding to a compass rose is sized to be rotatably positioned upon base 8 within wall 12. Opening 19 of disc 24 is sized and centrally located for receiving projection 13 of base 8 therethrough in order to allow disc 24 to be rotatably mounted upon base 8. The periphery 18 of disc 24 is undulated for providing a better contact of an operator's finger therewith to assist in the rotation thereof. Further, member 24 has a centrally located well 20 formed therein for receiving a disc-shaped map. The raised portion 17 of disc 24 has markings thereon similar to the markings of a compass rose. The inner of said markings forms a scale X, while the outer or peripheral markings form a scale Z. The numerals of said scale are, for the sake of clearness, abbreviated and should be multiplied by 10 to obtain the correct degree designated thereby. Upon the positioning of disc 24 within base 8 and being covered by top 7, scale Z will be observed at 14, whereas, scale X can be observed through sight opening 22.

In conjunction with the aforedescribed members, a map 6 is to be mounted within well 20 and projection 21 of disc 24 will fit into a correspondingly shaped opening of the map 6 in order that the map will be positioned relative to scale X so that the designations upon said map 6 will be in their true position in regard to magnetic north. These detachable maps, as hereinbefore described, can be made every fifteen days from information furnished by the Hydrographic Office of the U. S. Navy and which maps, as best shown in Fig. 3, show a centrally located radio range beacon and the courses transmitted thereby. These courses 2, 3 and 4 as herein illustrated are designated by the color red, whereas, course 1 is designated by the color green and they designate courses or legs by which an airman, with the aid of his radio compass, can follow to and from a city and the radio range station. Usually, only two of these legs designate courses to and from cities, whereas, the remaining legs are for the purpose of guiding an airman who may chance thereupon to the radio range station. To identify the particular radio range station, the airman will, by radio, receive range stations call letters in Morse code, weather reports, and at all other times either a dot and dash designating an A quadrant or a dash and dot designating an N quadrant, as shown in Fig. 3. However, upon reaching one of the legs 1, 2, 3 or 4, he will receive a steady hum or continuous monotone through his radio when he arrives on one of the legs which informs him that he is on course. Further disclosed upon the map are various obstructions shown in their true position relative to the radio range station and their altitudes above sea level, as well as other given information which may be desirable.

Transparent disc 23 has a series of parallel lines 5 etched upon the surface thereof and which lines 5 are positioned at an angle of 45° relative to the extremities of the arc formed by the restricted part 14 of top 7. As shown in Fig. 3, this restricted part 14 has a scale formed thereon, the center of which is designated 45° and which is perpendicular to lines 5. Point 15 of the restricted part 14 is designated as 90° and the other extremity of part 14, namely, point 16, is further designated as 90°. Restricted part 14 is further divided in equal degrees between the extremities thereof or the portions marked as 90°. By rotating disc 24 a mark of X scale from point 45° of Y scale to point 90° of said Y scale will indicate that disc 24 has been moved through an arc of 45°. It is obvious, therefore, that disc 24 can be rotated through any arc desired and the degree of this arc is readily and easily determinable.

Line 5' positioned diametrically of disc 24 on transparent disc 23 indicates the magnetic direction of the aircraft using the present device and scale X is to be read by referring to the point thereof in line with line 5'.

Assuming that disc 24 is rotatably mounted upon base 8, the pilot or navigator of an aircraft can obtain a map 6 showing thereon a given radio range station. The pilot places the map 6 within the well 20 in order that key 21 receives a similarly shaped indentation of map 6 and in this manner, map 6 is positioned with the designations thereon correctly placed relative to magnetic north. Cover 7 is then pivoted to enclose the map 6 and the disc 24 within the portion of the casing formed by base 8 and walls 12.

Now referring to Figs. 6 to 14 inclusive, to give an illustration of the use of the present instrument, first of all if a pilot is flying on instruments and wishes to orient himself on the station ahead, he first tunes in on said station by the frequency used thereby as designated upon the map. That is, as shown in Fig. 3, the frequency would be 347 kilocycles for KCDK at Billings, Montana, and the Morse code signal would be BI or —··· ·· The pilot then observes the magnetic heading of his plane as given by his magnetic compass and rotates disc 24 so that X scale shows the equivalent degree in line with line 5'. As the plane is proceeding, if N signal, that is, —· is received, he will know that he is in one of the N quadrants formed by the courses of the radio range beacon, that is, he is in either of the N quadrants as shown in Fig. 6. In order to locate the shortest route to the radio range station from his present position, it will be desirable to turn the plane to the average bisector of the N quadrant. By turning disc 24 until the line 5' passes through the average bisector of the N quadrant as shown in Fig. 7 and then observing the X scale reading which is in the present 140°, he will know the magnetic heading necessary to fly this bisector and he can then turn his plane in this direction. However, as further shown in Fig. 7, the plane may be in either of two N quadrants, that is, the upper quadrant formed by legs 1 and 2 or the lower N quadrant formed by legs 4 and 3. If upon continuing his course upon the indicated heading of X scale until the radio signal either fades or builds up, he will know whether he is approaching or flying away from the radio range station. If the signal fades, the pilot will know that he is in the upper N quadrant and is flying away from the radio station and in order to orient himself in order to know the magnetic heading necessary to fly 180° from his present heading, Z scale of disc 24 should be rotated with the finger twice the full movement allowed by the 90° portion 14. Then observing the new reading of X scale through sight opening 22, the pilot can turn his plane to the left or right in order that his magnetic compass will indicate a degree similar to that indicated by X scale. By so rotating disc 24, map 6 will be rotated therewith and line 5' will indicate to the pilot that he is still flying the average bisector but is going in the direction of the radio station as shown in Fig. 9. After the radio volume has built up to indicate that the plane is fairly close to the radio station, the pilot may select the range leg or course upon the right or left of the bisector he is now following and which leg he considers to be to his advantage in completing his particular problem. By turning disc 24 until the leg he wishes to intercept is at right angles to lines 5 or until the opposite leg, as shown in Fig. 10, runs parallel to the lines 5, then by conforming to the new heading indicated on X scale and turning the plane in that direction, the pilot will pick up the on course signal. Upon receiving this on course signal, Z scale should be rotated until the leg he is on runs parallel with the lines 5 on the transparent disc 23 and which is indicated in Fig. 11. The pilot will then be able to remain on the radio course by following the X scale indication unless a wind is blowing against the aircraft from one side. If this wind is being received against the right side of the aircraft, for example, the line 5' will pass through the leg 1 to the right thereof and the X scale will indicate the amount of drift. After the plane arrives over the station and the pilot wishes to continue out over any of the other courses he may select, he may line said leg as, for instance leg 3, with line 5' on the upper part of disc 23. The new course will be indicated on X scale and the pilot can maintain his plane upon this leg by following the magnetic course indicated thereby. If the pilot wishes to turn off the leg 3 to say 45° to the right, he should place his finger on the notch in the center of scale Z and move disc 24 up to the 90° position of Y scale. To return to leg 3, disc 24 should be given a 180° rotation and the new X scale reading will disclose the magnetic course to be followed.

A plane following the illustrated flight described above would fly a course similar to that shown in Fig. 15. That is, the plane would be in position 1 when the map 6 is in the position indicated in Fig. 6 and, correspondingly, the plane would follow to position 2 when map 6 is in a position as shown in Figs. 7 and 8, that is, the plane would be following on a course of 140° away from the radio station. Upon the pilot noting that he is flying away from the broadcasting station, the map was given a 180° turn and the new reading of X scale, as shown in Fig. 9, disclosed that the pilot should follow a compass reading of 320° as shown at position 4. This 320° was the course followed while flying the average bisector and in an effort to locate the plane upon one of the radio courses, the map was rotated as shown in Fig. 10 and an X scale reading of 350° disclosed. The plane then followed a course of 350° until it intercepted course or leg 1, whereupon, the map was rotated until leg 1 was in line with line 5' and the X scale reading as shown by Fig. 11 notified the pilot that he was to continue a course of 280°. After passing over the radio station, the pilot wished to follow the course or leg opposite to leg 1 and, therefore, as in Fig. 12, rotated the map until leg 3, the opposite leg, was in line with line 5' and the X scale reading notified the pilot that to remain on leg 3 he should follow a course of 275° as noted at position 7 of Fig. 15. The pilot, however, desired to follow a course 45° from leg 3 and, therefore, map 6 was rotated 45° by moving the notch of Z scale opposite the 45° mark of Y scale up to the 90° mark of said Y scale. The line 5' was at that time in line 320° on the X scale and the pilot followed this course as shown in position 8. Map 6 was given a 180° turn and the pilot therefore informed that he should follow a direction of 140° to return upon the leg 3. The pilot then returned to leg 3 and by following the procedure hereinbefore described, followed leg 3 back to the radio station.

Whenever a pilot wishes to fly to a city or locality that is off the Federal airway routes but which locality is equipped with a local radio broadcasting station, the pilot may use the present indicating instrument by substituting a map substantially as shown in Fig. 5 of the drawings for the type of map shown and described for Fig. 3. By locating the radio tower in the center of the map disc 6' and by information obtained from a map of that locality, the pilot may locate the nearest airport in its true bearing with respect to the radio towers thereon. Further, by using the aforementioned map of the particular locality flight, obstructions and their altitudes should be placed in position on said map relative to the aforementioned radio station. The airport and said obstructions should be placed upon the map at points thereof similar to the actual magnetic directions from the radio tower. The map should have further placed thereupon a line drawn from the airport to and through the radio towers. Therefore, with the map positioned within the present indicating instrument with the descriptive matter thereon placed in its actual magnetic position relative to the compass rose of disc 24 and top 7 pivoted thereover, the pilot may fly by use of his radio compass to the radio broadcasting station tower or antenna. Upon arrival of the aircraft at the tower, the line through the radio station and airport should be made to coincide with line 5' by rotating the disc 24. The magnetic heading necessary to fly a reciprocal course away from the radio station can therefore be noted upon X scale. The pilot will then note the difference between the indicated heading and the heading necessary to fly the ground track by noting objects shown on the map and this difference will give him the amount of the aircraft's drift. By rotating disc 24 180°, that is, two full movements of Y scale, X scale will give the pilot the magnetic heading necessary to be followed by making a 180° turn and after the pilot has corrected this new heading for the drift of his aircraft on his way back to the radio station, the pilot will be able to fly directly to the airport even though a considerable distance, for example ten to fifteen miles away from the radio station.

The foregoing illustrations describe only some of the possible extensive uses of the present bearing and indicator instrument. With the actual use of the instrument, further aids to aerial navigation are noted such as assisting an airman to locate the bearing of the nose of his aircraft relative to a radio station antenna and by use of this bearing, obtain the true magnetic heading of the nose of said air craft. In order to find the magnetic bearing or heading of the nose of the aircraft relative to a radio station antenna, the pilot can add or subtract with Y scale the angle indicated by the radio compass azimuth scale. Further, the indicator may be used in solving various radio problems in connection with blind landing systems. The various aids to navigation accomplished by the use of the present indicating instrument is well contemplated in the present invention and have not each been expressly set forth herein due to the manifold members thereof. However, these problems can be readily solved by using the instrument by the instructions given in the foregoing illustrations.

It is readily appreciated that changes can be made in the construction and arrangement of the present device as shown and described but such changes or modifications as come within the scope of the accompanying claims are deemed to be part of the present invention.

I claim:

1. A navigation instrument comprising a base, a compass rose rotatably mounted upon said base, a cover pivotally carried by said base for covering said base and compass rose, said cover having an opening formed along its periphery giving access to the outer edge of said compass rose, a scale marked along the outer edge of said compass rose dividing the rose into three hundred sixty equal parts, a scale marked along the edge of said opening having the marks thereof capable of coinciding with the marks of said scale on said rose edge, a line carried by said cover diametrically of said compass rose and said cover having a sight opening formed therein for observing the portion of the compass rose scale coinciding with said diametral line.

2. A navigation instrument comprising a base, a compass rose rotatably mounted upon said base, a cover pivotally carried by said base for covering said base and compass rose, said cover having an opening formed along its periphery giving access to the outer edge of said compass rose, said opening being of a length along said periphery equal to an arc of a given number of degrees, a scale marked along the outer edge of said compass rose dividing the same into 360 degrees, a line carried by said cover diametrically of said compass rose and said cover having a sight opening formed therein for observing the portion of the compass rose scale coinciding with said diametral line.

3. A navigation instrument comprising a base, a compass rose rotatably mounted upon said base, a cover pivotally carried by said base for covering said base and compass rose, said cover having an opening formed along its periphery giving access to the outer edge of said compass rose, said opening being of a length along said periphery equal to an arc of 45 degrees, a scale marked along the outer edge of said compass rose dividing the same into 360 degrees, a line carried by said cover diametrically of said compass rose and said cover having a sight opening formed therein for observing the portion of the compass rose scale coinciding with said diametral line.

4. A navigation instrument comprising a base, a compass rose rotatably mounted upon said base, a cover pivotally carried by said base for covering said base and compass rose, said cover having an opening formed along its periphery giving access to the outer edge of said compass rose, said opening being of a length along said periphery equal to an arc of 45 degrees, a scale marked along the outer edge of said compass rose dividing the same into 360 degrees, a scale marked along the edge of said opening dividing the opening into 45 degrees, a line carried by said cover diametrically of said compass rose and said cover having a sight opening formed therein for observing the portion of the compass rose scale coinciding with said diametral line.

5. A navigation instrument to be used with magnetic and radio compasses in conjunction with a radio station antenna comprising a base, a compass rose rotatably mounted upon said base, a disc detachably mounted in a given position on said rose and having a plurality of points thereon each being in a given position relative to the other points and said rose scale, a transparent cover pivotally connected to said base and having an opening in one portion thereof for permitting said compass rose to be rotated, and a series of parallel lines carried by said cover having their center line diametrically positioned of said compass rose and disc.

6. A navigation instrument to be used with magnetic and radio compasses in conjunction with radio range stations of the character described, comprising a base, a compass rose rotatably mounted upon said base, a plate detachably mounted in a given position on said rose and having lines thereon extending radially in a given position relative to said rose scale, a cover having a portion thereof transparent and being pivotally connected to said base for at times covering the same, said cover having an opening formed in its periphery giving access to the periphery of said compass rose, a scale marked along the outer edge of said compass rose, a scale marked along the edge of said opening having the marks thereof capable of coinciding with the marks of said scale on the rose edge, a series of parallel lines carried by said cover having their center line diametrically positioned of said compass rose and said cover having a sight opening therein for observing a portion of said compass rose scale coinciding with said diametral line.

7. A navigation instrument to be used with magnetic and radio compasses in conjunction with radio range stations of the character described, comprising a base, a compass rose detachably and rotatably mounted upon said base, a disc detachably mounted in a given position on said base and having a plurality of lines thereon each extending radially from the center of said disc in a predetermined position relative to said disc center and said rose scale, a cover pivotally connected to said base having a portion thereof transparent for viewing said disc therethrough, said cover having an opening formed in its periphery giving access to the periphery of said compass rose, said opening forming a 90 degree arc from one end to the opposite end thereof, said opening having a scale mark along the edges thereof dividing the 90 degree arc into equal degrees, said compass rose periphery being divided into equal degrees by marks therealong and which marks are capable of coinciding with said top scale marks, said top having a portion thereof transparent for viewing the scale of said compass rose, and a series of parallel lines etched on the transparent portions of said cover having their center line diametrically positioned of said compass rose scale and said disc.

ALVIN D. NIEMEYER.